(12) United States Patent
Davydov et al.

(10) Patent No.: US 11,765,764 B2
(45) Date of Patent: *Sep. 19, 2023

(54) CSI (CHANNEL STATE INFORMATION)-RS (REFERENCE SIGNAL) OVERHEAD REDUCTION FOR CLASS B FD (FULL DIMENSIONAL)-MIMO (MULTIPLE INPUT MULTIPLE OUTPUT) SYSTEMS

(71) Applicant: Apple Inc., Cupertino, CA (US)

(72) Inventors: Alexei Davydov, Nizhny Novgorod (RU); Gregory V. Morozov, Nizhny Novgorod (RU); Victor Sergeev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,904

(22) Filed: Sep. 1, 2022

(65) Prior Publication Data

US 2023/0043098 A1 Feb. 9, 2023

Related U.S. Application Data

(63) Continuation of application No. 16/067,929, filed as application No. PCT/US2016/068516 on Dec. 23, 2016, now Pat. No. 11,483,842.

(Continued)

(51) Int. Cl.
*H04W 72/542* (2023.01)
*H04B 7/06* (2006.01)
(Continued)

(52) U.S. Cl.
CPC ........ *H04W 72/542* (2023.01); *H04B 7/0417* (2013.01); *H04B 7/0617* (2013.01);
(Continued)

(58) Field of Classification Search
CPC .............. H04W 72/085; H04W 72/082; H04L 5/0053; H04L 5/0039; H04L 5/0091;
(Continued)

(56) References Cited

U.S. PATENT DOCUMENTS

| 10,271,304 B2 | 4/2019 | Davydov |
| 2015/0117350 A1* | 4/2015 | Seo ........................ H04L 5/0048 370/329 |

(Continued)

OTHER PUBLICATIONS

International Search Report dated Apr. 21, 2017 for International Application PCT/US2016/068516.

(Continued)

*Primary Examiner* — Ian N Moore
(74) *Attorney, Agent, or Firm* — Eschweiler & Potashnik, LLC

(57) ABSTRACT

Techniques for measuring CSI (Channel State Information) based on beamformed CSI-RS having reduced overhead are discussed. One example embodiment configured to be employed in a UE (User Equipment) comprises a memory; and one or more processors configured to: process higher layer signaling indicating one or more CSI-RS resources associated with a plurality of REs (Resource Elements) comprising a RE for each CSI-RS resource for each of one or more CSI-RS APs (Antenna Ports) in each of a plurality of continuous PRBs (physical resource blocks); process additional higher layer signaling comprising one or more CSI-RS parameters that indicate a subset of the plurality of REs associated with a beamformed CSI-RS transmission; decode one or more CSI-RSs from the indicated subset; and measure one or more CSI parameters based on the decoded one or more CSI-RSs.

17 Claims, 13 Drawing Sheets

Related U.S. Application Data

(60) Provisional application No. 62/334,309, filed on May 10, 2016, provisional application No. 62/290,680, filed on Feb. 3, 2016.

(51) Int. Cl.
  *H04L 5/00* (2006.01)
  *H04W 72/541* (2023.01)
  *H04B 7/0417* (2017.01)

(52) U.S. Cl.
  CPC ......... *H04B 7/0626* (2013.01); *H04L 5/0023* (2013.01); *H04L 5/0039* (2013.01); *H04L 5/0048* (2013.01); *H04L 5/0053* (2013.01); *H04L 5/0091* (2013.01); *H04W 72/541* (2023.01)

(58) Field of Classification Search
  CPC ... H04L 5/0048; H04L 5/0023; H04B 7/0417; H04B 7/0626; H04B 7/0617
  See application file for complete search history.

(56) References Cited

U.S. PATENT DOCUMENTS

| | | | |
|---|---|---|---|
| 2015/0365960 A1* | 12/2015 | Davydov | H04W 52/244 370/252 |
| 2017/0244533 A1* | 8/2017 | Onggosanusi | H04B 7/0478 |
| 2018/0115357 A1* | 4/2018 | Park | H04L 5/0051 |

OTHER PUBLICATIONS

3rd Generation Partnership Project; Technical Specification Group Radio Access Network; Evolved Universal Terrestrial Radio Access (E-UTRA); Physical channels and modulation (Release 13). 3GPP TS 36.211 V13.0.0 (Dec. 2015). LTE Advanced Pro. 141 pages.

Non-Final Office Action dated Dec. 3, 2019 in connection with U.S. Appl. No. 16/067,929.

Notice of Allowance dated Jun. 6, 2022 in connection with U.S. Appl. No. 16/067,929.

* cited by examiner

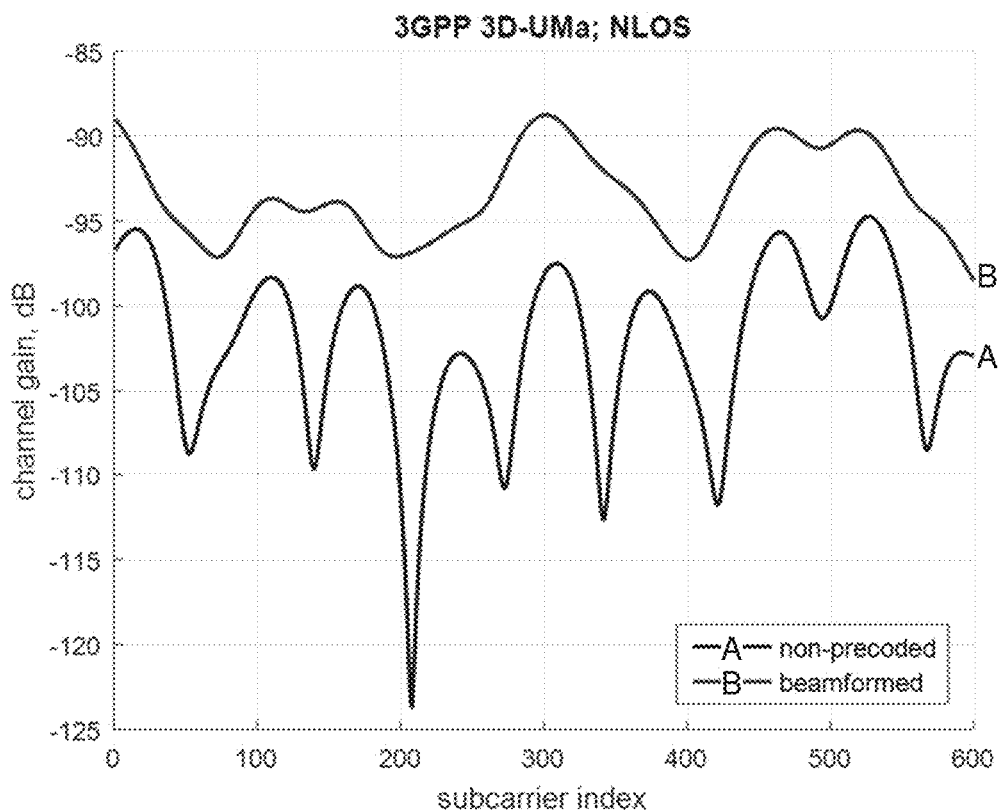
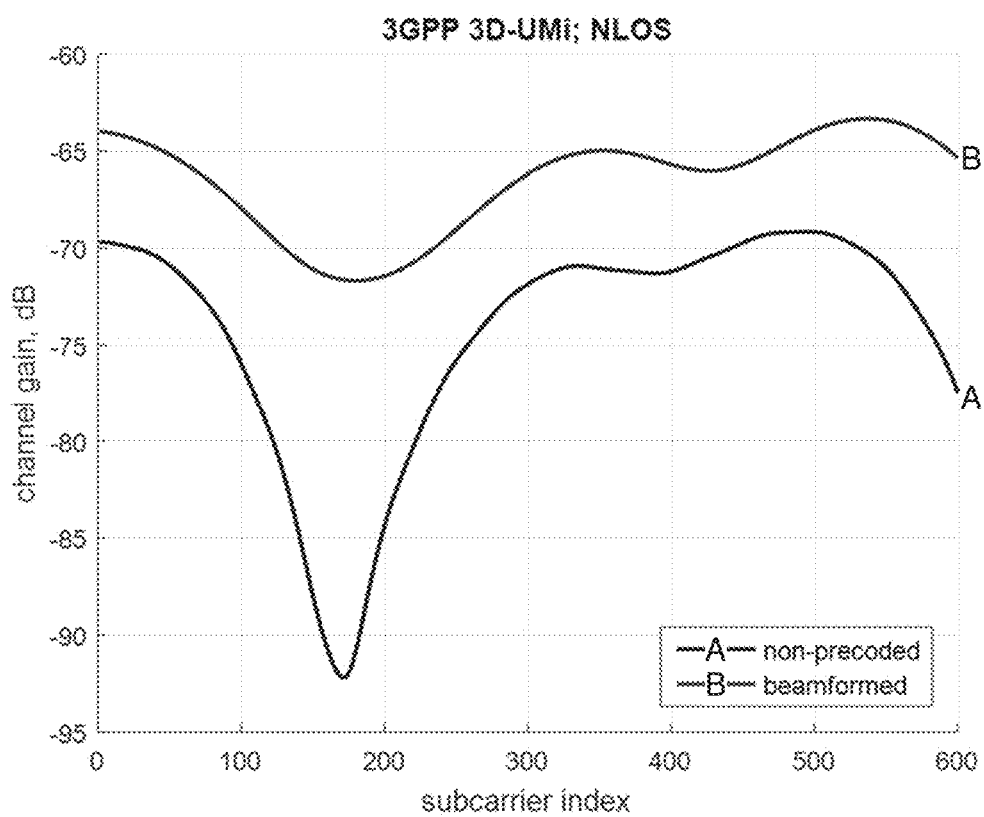
FIG. 6

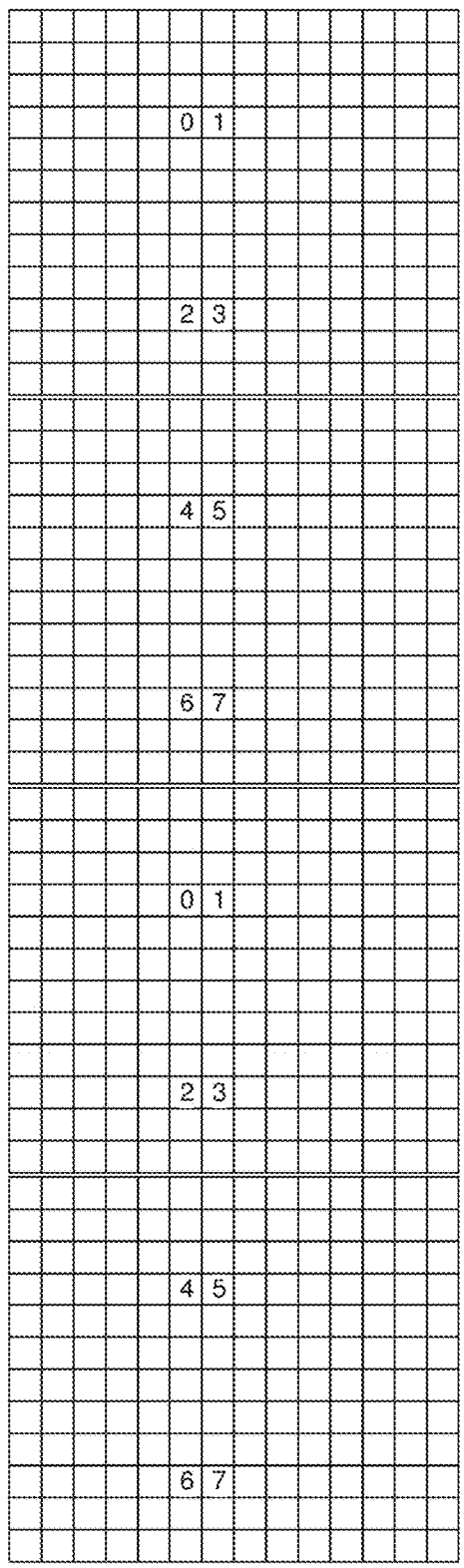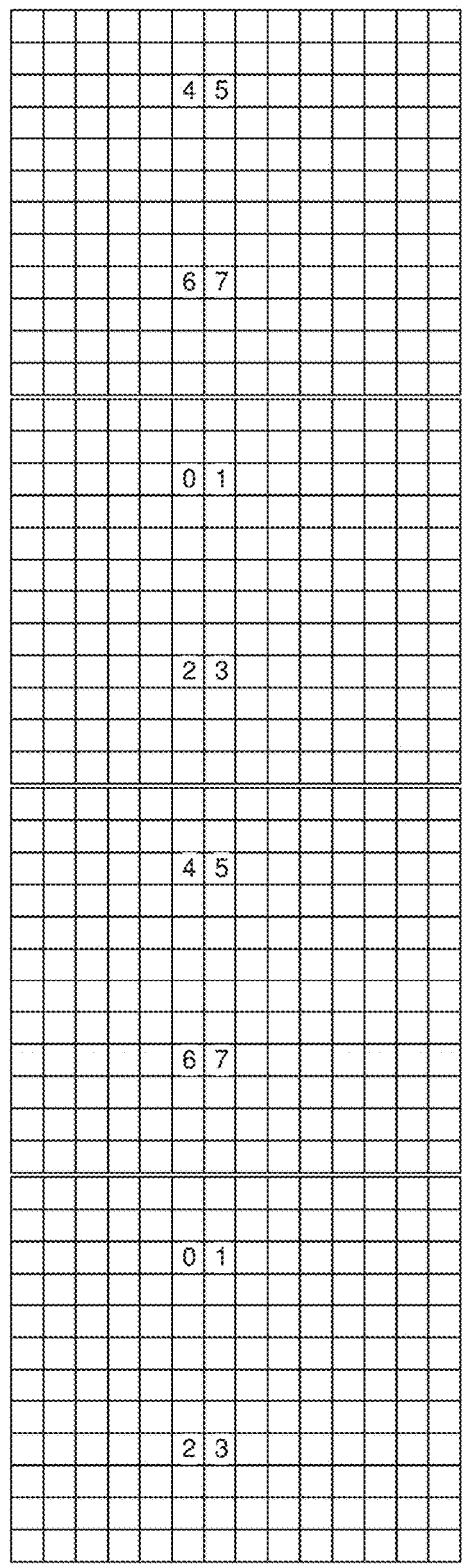
CSI-RS AP=15+#
FIG. 7

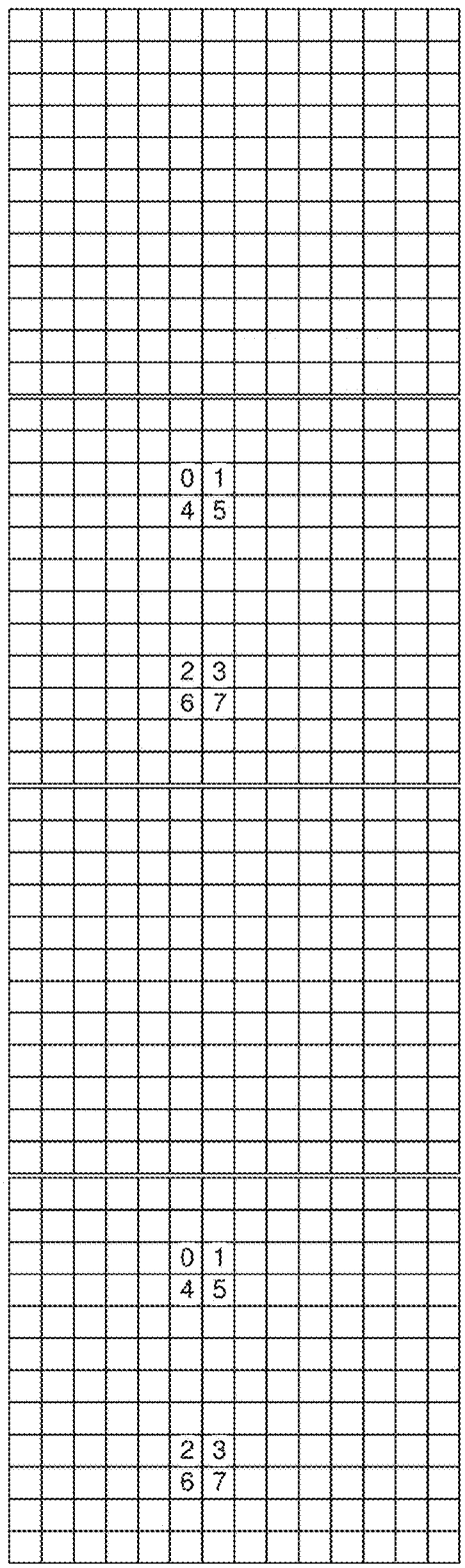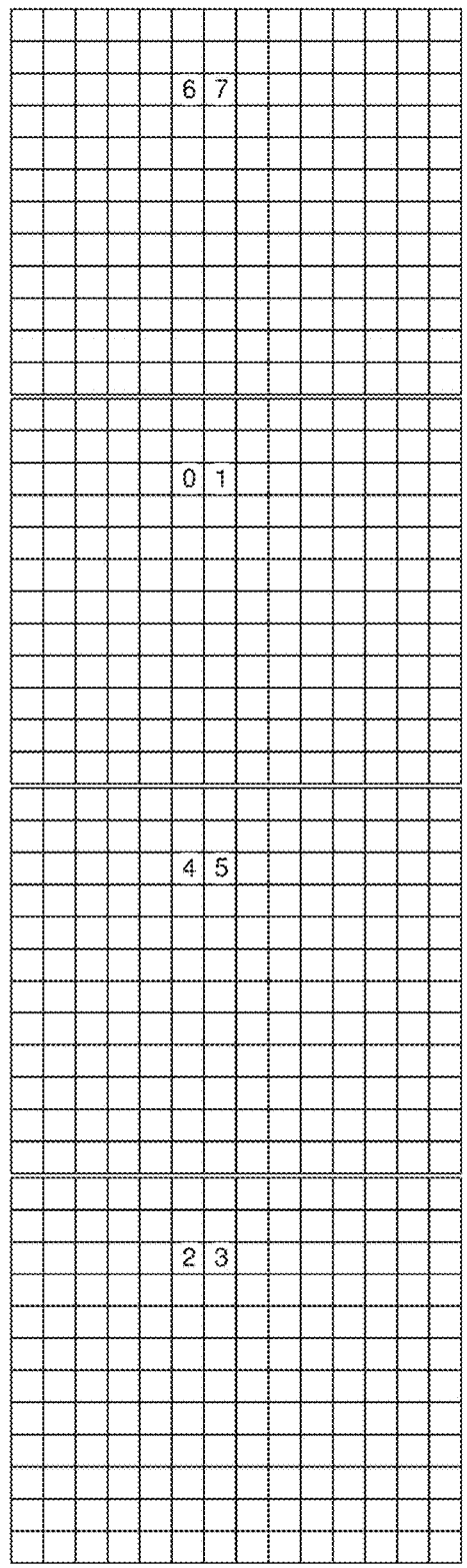
CSI-RS AP=15+#
FIG. 8

CSI (CHANNEL STATE INFORMATION)-RS (REFERENCE SIGNAL) OVERHEAD REDUCTION FOR CLASS B FD (FULL DIMENSIONAL)-MIMO (MULTIPLE INPUT MULTIPLE OUTPUT) SYSTEMS

REFERENCE TO RELATED APPLICATIONS

This application is a continuation of U.S. application Ser. No. 16/067,929, filed on Jul. 3, 2018, now issued as U.S. Pat. No. 11,483,842, which is the National Stage of International Application No. PCT/US2016/068516, filed on Dec. 23, 2016, which claims the benefit of U.S. Provisional Applications No. 62/334,309, filed on May 10, 2016, and U.S. Provisional Applications No. 62/290,680, filed on Feb. 3, 2016, the contents of which are herein incorporated by reference in their entirety.

FIELD

The present disclosure relates to wireless technology, and more specifically to techniques for reducing CSI (Channel State Information)-RS (Reference Signal) signaling overhead in Class B FD (Full Dimensional)-MIMO (Multiple Input Multiple Output) systems.

BACKGROUND

The 3GPP (Third Generation Partnership Project) Rel-8 (Release 8) MIMO (Multiple Input Multiple Output) and subsequent MIMO enhancements in Rel-10 and Rel-11 were designed to support antenna configurations at the eNodeB (Evolved Universal Terrestrial Radio Access Network (E-UTRAN) Node B) that are capable of adaptation in azimuth only. Recently, there has been a significant interest in enhancing system performance through the use of antenna systems having a two-dimensional array structure that provides adaptive control over both the elevation dimension and the azimuth dimension. The additional control over the elevation dimension enables a variety of strategies such as sector-specific elevation beamforming (e.g., adaptive control over the vertical pattern beamwidth and/or downtilt), advanced sectorization in the vertical domain, and user-specific elevation beamforming. Vertical sectorization can improve average system performance through the higher gain of the vertical sector patterns, but vertical sectorization generally does not need additional standardization support. UE (User Equipment)-specific elevation beamforming promises to increase the SINR (Signal-to-Interference-plus-Noise Ratio) statistics seen by the UEs by pointing the vertical antenna pattern in the direction of the UE while spraying less interference to adjacent sectors by virtue of being able to steer the transmitted energy in elevation.

BRIEF DESCRIPTION OF THE DRAWINGS

FIG. 6 is a diagram illustrating graphs of channel transfer functions for 3GPP 3D (Three Dimensional)-UMa (Urban Macro Cell) and 3D-UMi (Urban Micro Cell) channel models, showing the difference between the effective beamformed channel and the non-precoded channel in connection with various aspects described herein.

FIG. 7 is a pair of diagrams illustrating example CSI-RS patterns with reduced overhead, according to various aspects described herein.

FIG. 8 is a pair of diagrams illustrating additional example CSI-RS patterns with reduced overhead, according to various aspects described herein.

DETAILED DESCRIPTION

Figure 1:
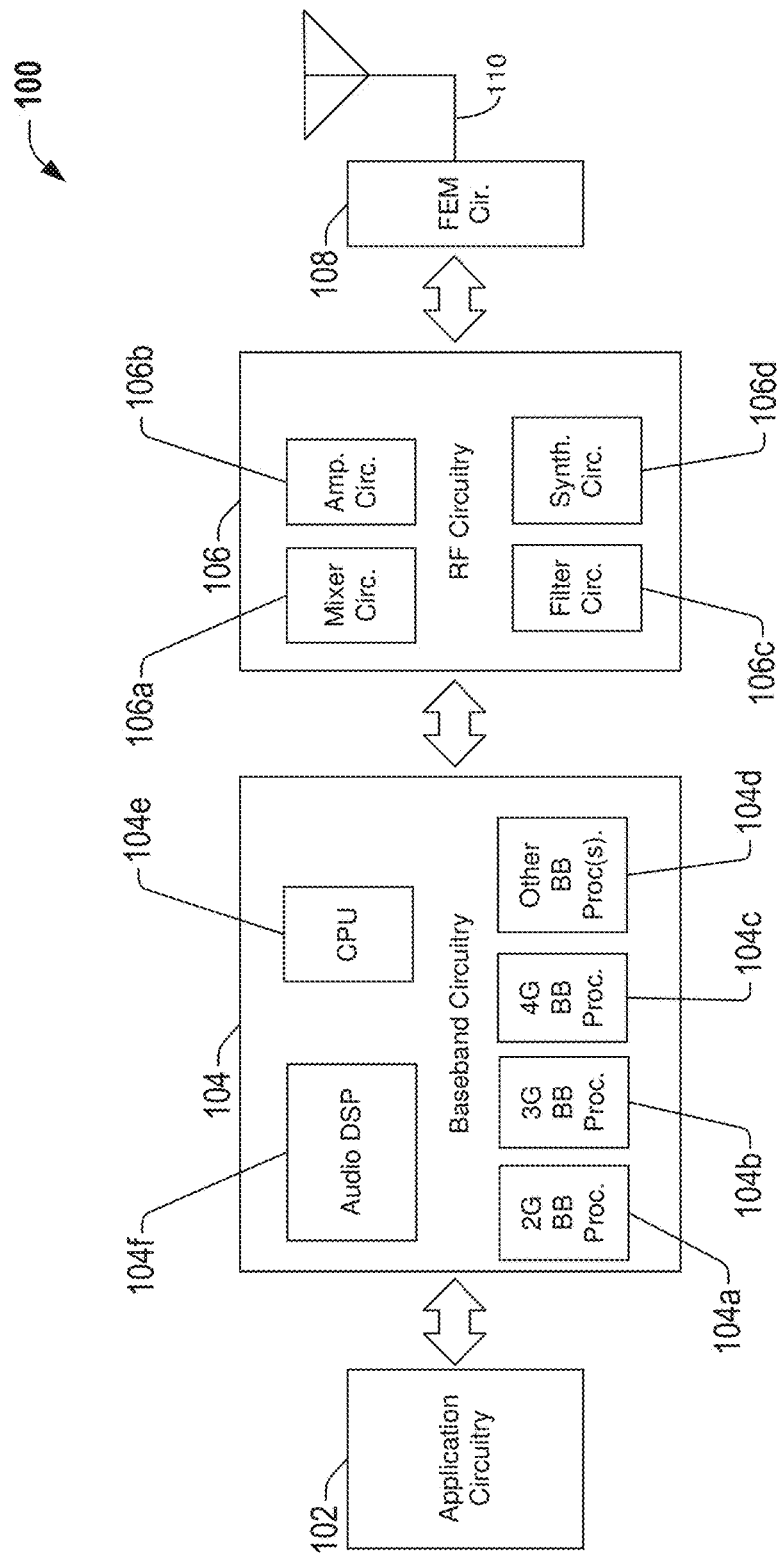
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband circuitry 104 may interface with the application circuitry 102 for generation and processing of the baseband signals and for controlling operations of the RF circuitry 106. For example, in some embodiments, the baseband circuitry 104 may include a second generation (2G) baseband processor 104*a*, third generation (3G) baseband processor 104*b*, fourth generation (4G) baseband processor 104*c*, and/or other baseband processor(s) 104*d* for other existing generations, generations in development or to be developed in the future (e.g., fifth generation (5G), 6G, etc.). The baseband circuitry 104 (e.g., one or more of baseband processors 104*a-d*) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104*e* of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104*f*. The audio DSP(s) 104*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications circuitry 102 depending on the desired output frequency. In some embodiments, a divider control input (e.g., N) may be determined from a look-up table based on a channel indicated by the applications circuitry 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Additionally, although the above example discussion of UE device 100 is in the context of a UE device, in various aspects, a similar device can be employed in connection with a base station (BS) such as an Evolved NodeB (eNB), etc.

Figure 2:
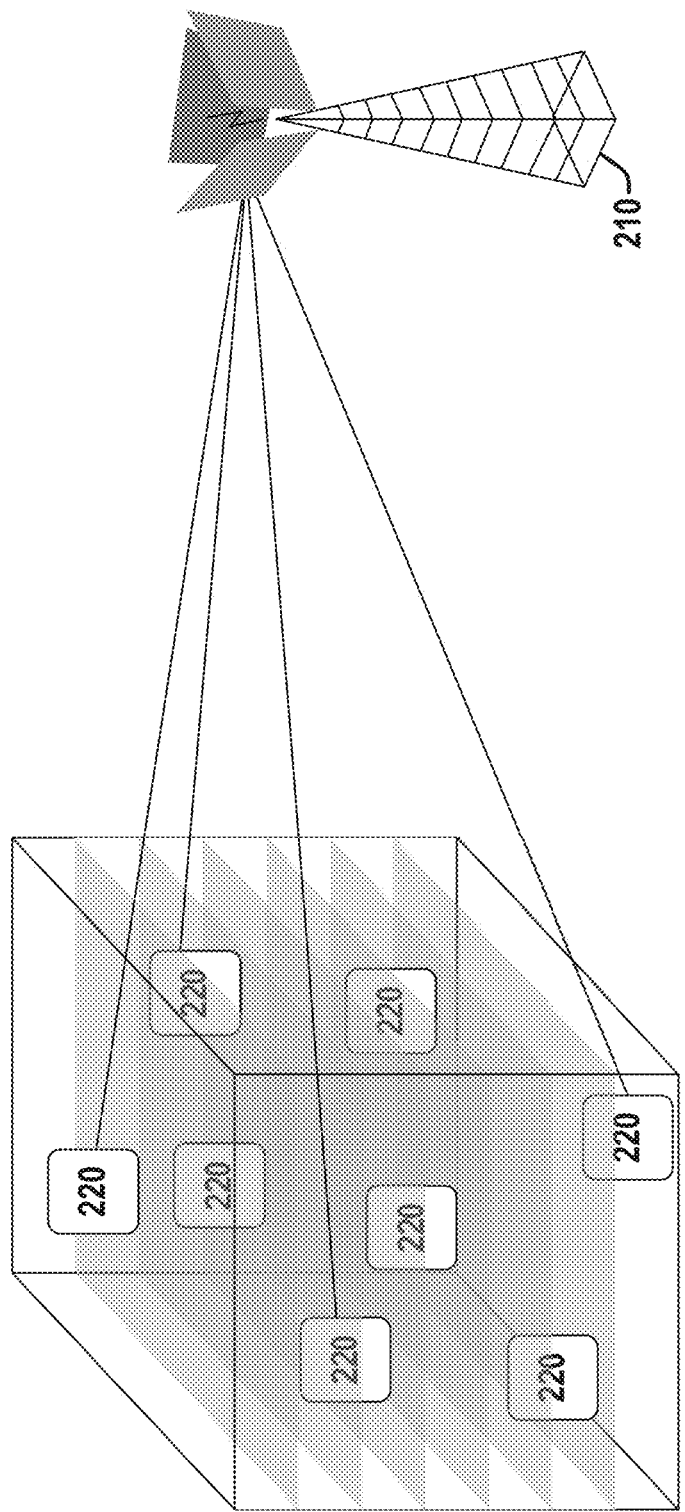
FIG. 2 is an illustration of an example scenario implementing elevation beamforming in a FD-MIMO system, showing an example Enhanced NodeB (eNB) employing elevation beamforming to transmit to a plurality of UEs at different elevations.

Referring to FIG. 2, illustrated is a diagram of an example scenario implementing elevation beamforming in a FD-MIMO system, showing an example eNB 210 employing elevation beamforming to transmit to a plurality of UEs 220 at different elevations, in connection with various aspects described herein.

In Rel-13 FD (Full Dimensional)-MIMO, two types of CSI (Channel State Information) feedback schemes were specified to support FD-MIMO— class A (as CSI for non-precoded CSI-RS (Reference Signal)) and class B (as CSI for beamformed CSI-RS). In the class A scheme, CSI-RS is transmitted from each physical antenna of the eNB without additional beamforming, while in class B the CSI-RS antenna ports are beamformed prior to transmission from the physical antennas. Due to beamforming gain, CSI reporting for class B can be advantageous, especially in coverage limited scenarios (e.g., higher frequency band deployment scenarios).

The cell-edge performance for SU (Single User)-MIMO and cell-center performance for MU (Multi User)-MIMO can be improved by using high resolution feedback. For class B CSI reporting, high resolution feedback can be achieved by transmitting additional CSI-RS resources (K>1) or ports (K=1), which can be associated with the additional beams. For example, the additional beams can be obtained by 'x' times beam oversampling, which involves 'x' times more CSI-RS resources or ports comparing to CSI reporting without beam oversampling. However, these additional CSI-RS resources or ports increase overhead involved in CSI-RS, and impact system performance. In various aspects, techniques discussed herein can be employed to reduce overhead due to CSI-RS, which can minimize the impact on system performance due to of the additional CSI-RS resource(s) or port(s).

Figure 3:
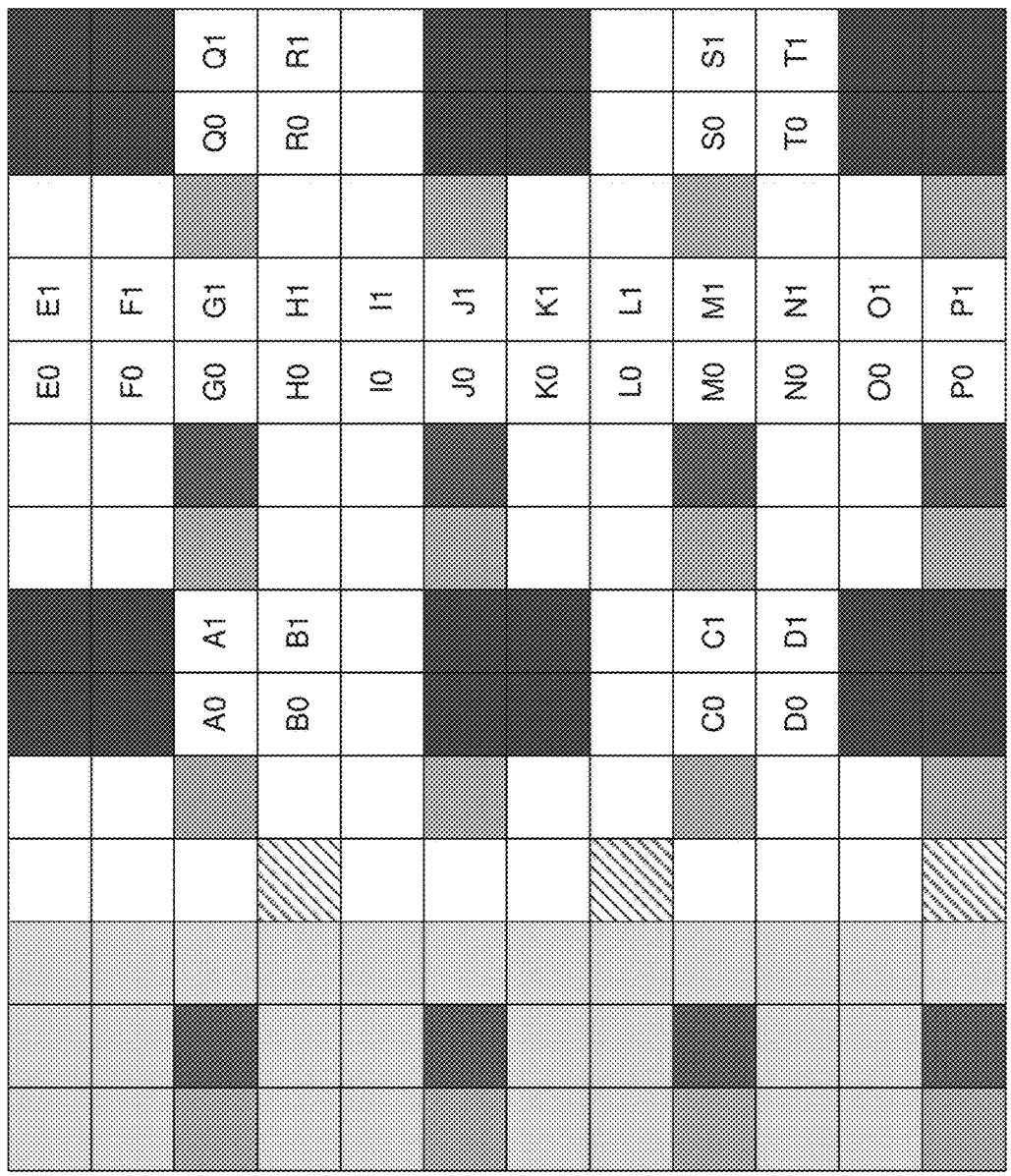
FIG. 3 is a diagram illustrating a physical resource block showing example CSI (Channel State Information)-RS (Reference Signal) patterns corresponding to 2 CSI-RS antenna ports for normal cyclic prefix (CP), in connection with various aspects described herein.
Figure 4:
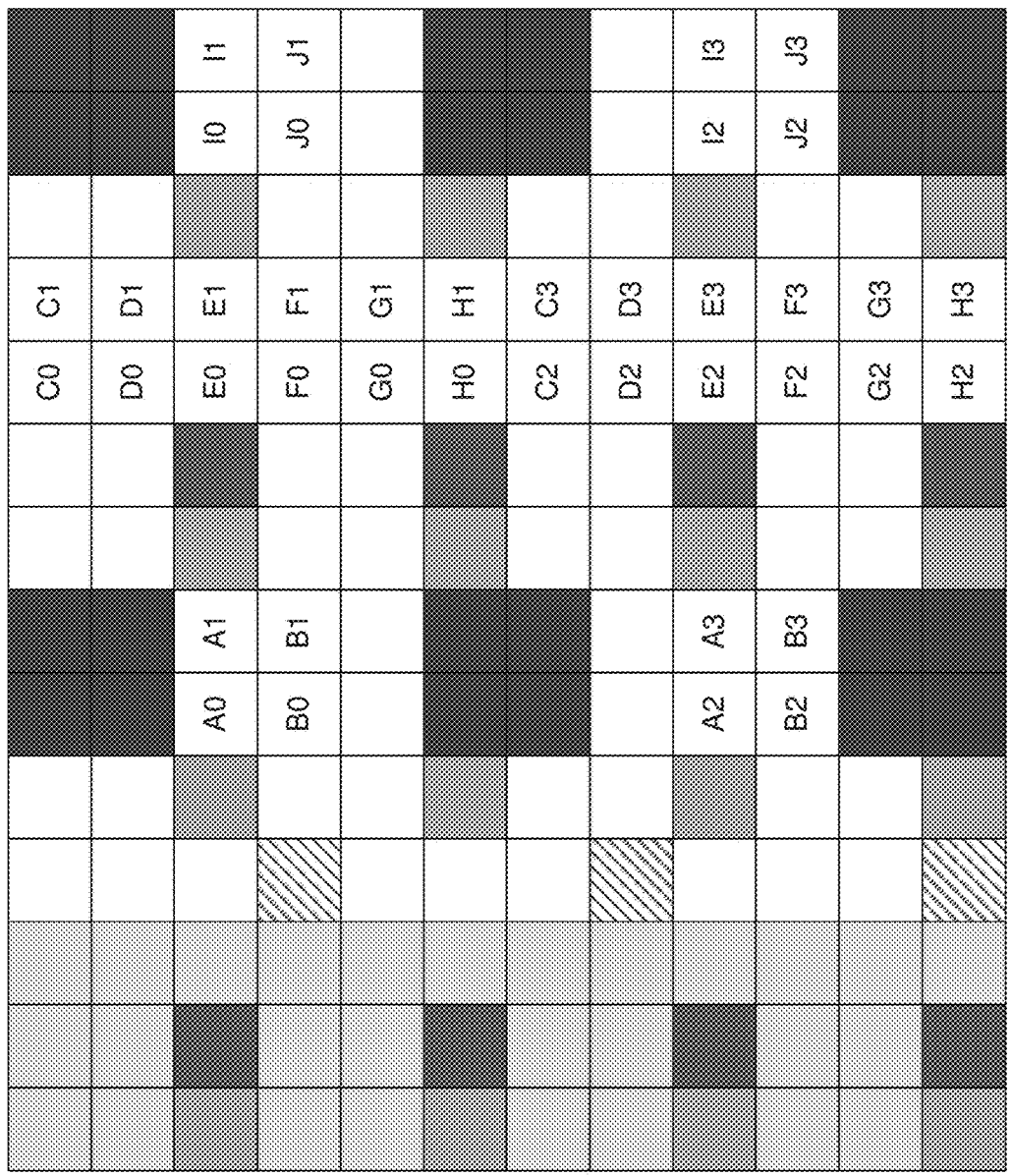
FIG. 4 is a diagram illustrating a physical resource block showing example CSI-RS patterns corresponding to 4 CSI-RS antenna ports for normal CP, in connection with various aspects described herein.

Referring to FIG. 3, illustrated is a diagram of a physical resource block showing example CSI-RS patterns (labeled A-T) corresponding to 2 CSI-RS ports are shown for normal cyclic prefix (CP), where ports 0-1 correspond to CSI-RS ports 15-16, in connection with various aspects described herein. Referring to FIG. 4, illustrated is a diagram of a physical resource block showing example CSI-RS patterns (labeled A-J) corresponding to 4 CSI-RS ports are shown for normal CP, where ports 0-3 correspond to CSI-RS ports 15-18, in connection with various aspects described herein.

Figure 5:
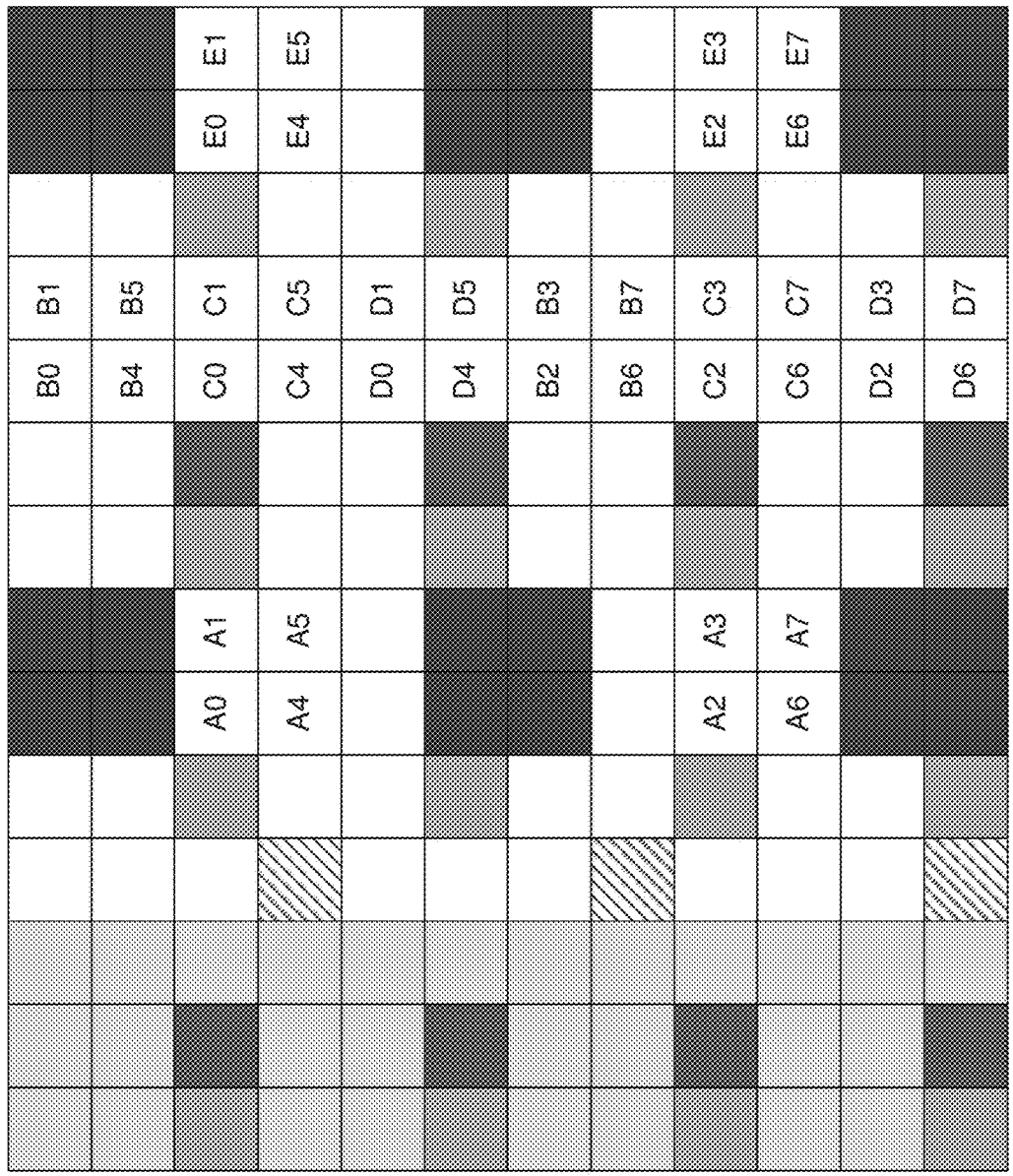
FIG. 5 is a diagram illustrating a physical resource block showing example CSI-RS patterns corresponding to 8 CSI-RS antenna ports for normal CP, in connection with various aspects described herein.

Referring to FIG. 5, illustrated is a diagram of a physical resource block showing example CSI-RS patterns (labeled A-E) corresponding to 8 CSI-RS ports are shown for normal CP, where ports 0-7 correspond to CSI-RS ports 15-22, in connection with various aspects described herein.

CSI resource mapping in conventional LTE (Long Term Evolution) systems is described as follows in 3GPP TS (Technical Specification) 36.211 at 6.10.5.2 ("Mapping to resource elements"), and in table 6.10.5.2-1 of TS 36.211 (corresponding to table 1, below):

"In subframes configured for CSI reference signal transmission, the reference signal sequence $r_{l,n_s}(m)$ [is] mapped to complex-valued modulation symbols $a_{k,l}^{(p)}$ used as reference symbols on antenna port p according to $$a_{k,l}^{(p)} = w_{l''} \cdot r_{l,n_s}(m')$$

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

"The quantity (k', l') and the . . . conditions on $n_s$ are given by Tables 6.10.5.2-1 and 6.10.5.2-2 for normal and extended cyclic prefix, respectively."

TABLE 1

Mapping from CSI reference signal configuration to (k', l') for normal cyclic prefix

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |

TABLE 1-continued

Mapping from CSI reference signal configuration to (k', l') for normal cyclic prefix

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame | 20 | (11, 1) | 1 | (11, 1) | 1 | (11, 1) | 1 |
| structure | 21 | (9, 1) | 1 | (9, 1) | 1 | (9, 1) | 1 |
| type 2 | 22 | (7, 1) | 1 | (7, 1) | 1 | (7, 1) | 1 |
| only | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

In the Class B FD-MIMO system with large number of beams (i.e. high resolution feedback), an eNB can be transmitting a large number of CSI-RS signals (resources or ports), where each port pair would be associated with the beam transmitted by using different polarization. With the existing CSI-RS structure, designed assuming non-precoded CSI-RS, this CSI-RS overhead can be an issue that may offset the performance gains provided by the increased CSI resolution feedback. However, in various embodiments, this CSI-RS overhead can be reduced via techniques discussed herein for CSI-RS transmission in connection with beamforming of the antenna ports.

In various aspects, techniques discussed herein can be employed to reduce the CSI-RS overhead for class B (e.g., beamformed) CSI reporting. Due to beamforming applied for CSI-RS antenna ports, the measured channel (on average) on CSI-RS antenna ports becomes less frequency selective compared to the channel without beamforming. Therefore, the existing density of CSI-RS of 1 RE per PRB can be reduced. The reduced density of the CSI-RS can be used to multiplex the additional CSI-RS antenna ports corresponding to additional beams with increased CSI resolution. Various embodiments can exploit these properties of the channel (e.g., less frequency selectivity) and can provide reduced CSI-RS overhead to facilitate Class B CSI reporting with increased CSI resolution, for example, such as beam oversampling.

Techniques described herein can reduce the CSI-RS overhead for class B CSI reporting. Conventional CSI-RS (e.g., defined in Rel-10) was designed assuming non-precoded CSI-RS structure, where each antenna port is transmitted without additional beamforming. At the same time, in class B CSI reporting, due to beamforming applied on CSI-RS antenna ports, the statistical properties of the measured channel are different from the properties of the channel without beamforming. Referring to FIG. 6, illustrated are graphs of channel transfer functions for 3GPP 3D (Three Dimensional)-UMa (Urban Macro Cell) and 3D-UMi (Urban Micro Cell) channel models, showing the difference between the effective beamformed channel and the non-precoded channel in connection with various aspects described herein.

As can be seen in FIG. 6, due to spatial filtering provided by the beamforming on CSI-RS, some of the multi-path component of the channel will be attenuated. As a result, the number of multipath components in the effective channel after beamforming is reduced, making the channel less frequency selective compared to the channel without beamforming. Accordingly, in various aspects described herein, the density of CSI-RS signals can be reduced to increase the number of CSI-RS patterns which can be used to transmit CSI-RS ports with the additional beams. As an example, the received signal can include a density of CSI-RS of less than 1 RE (Resource Element) per PRB (physical resource block).

In a first set of embodiments, CSI-RS REs of antenna ports can be decimated, wherein the CSI-RS REs of a given AP are transmitted every N (N>1) PRBs, where in various aspects the value N can be configurable to the UE (e.g., via higher layer signaling) or can be fixed in the specification. In the first set of embodiments, a UE can be configured with (in addition to N, in aspects with N configurable) a frequency shift $N_{shift}$ of the CSI-RS pattern that can indicate the one CSI-RS among 0, . . . , N−1 of the decimated CSI-RS (e.g., based on $N_{shift}$, a UE can determine, for a set of N contiguous PRBs, which 1 PRB of those N PRBs comprises CSI-RS).

In a second set of embodiments, frequency hopping or cycling of the CSI-RS pattern frequency shift ($N_{shift}$) can be applied to the decimated CSI-RS pattern to provide frequency diversity to the CSI-RS transmission, such that $N_{shift}$ can vary over time. In various aspects, $N_{shift}$ can vary over CSI-RS transmission instances. For example, the $N_{shift}$ can be derived as mod(i, N), where i is the CSI-RS transmission instance, or can cycle through the values 0, . . . , N−1 based on some other repeating pattern. As another example, $N_{shift}$ can be derived from the pseudo-random sequence generated by the random generator based on the initialization seed. The initialization seed can be configured by higher layer signaling such as RRC.

In further embodiments, different values of the frequency shift $N_{shift}$ (e.g., which can be fixed or time varying, depending on the embodiment) can be assigned to CSI-RS resource elements corresponding to different CSI-RS antenna ports. As one example, for a scenario involving 8 CSI-RS ports, a frequency shift $N_{shift}$=0 can be applied to subcarriers for the port group {15,16,17,18} and $N_{shift}$=13 can be applied to subcarriers for the port group {19,20,21,22}. As another example, the shift $N_{shift}$=0 can be applied to subcarriers for the port group {19,20,21,22} and $N_{shift}$=11 can be applied to subcarriers for the port group {15,16,17,18}.

Referring to FIG. 7, illustrated are two diagrams showing the above two options with a frequency decimation factor of N=2 PRBs and different values of $N_{shift}$ applied to subcarriers for the port group {19,20,21,22} and to subcarriers for the port group {15,16,17,18}, according to various aspects described herein. Referring to FIG. 8, illustrated is a diagram showing a common $N_{shift}$ for each subcarrier for the port group {15, . . . , 22} with a frequency decimation factor of N=2 PRBs on the left, and on the right a frequency decimation factor of N=4 PRBs with different $N_{shift}$ values for subcarriers for each pair of ports {15,16}, {17,18}, {19,20}, and {21,22} according to various aspects described herein. In both FIGS. 7 and 8, APs {15, . . . , 22} are represented by the values {0, . . . , 8}, respectively. In various embodiments, different values of N and/or $N_{shift}$ can be applied, with a common $N_{shift}$ applied, or two or more different $N_{shift}$ values.

Flexible frequency shift assignment as described herein can be advantageous because the resulting CSI-RS pattern configurations can be perfectly aligned with the legacy Zero Power (ZP) CSI-RS configurations. Both the left and right patterns in FIG. 7 are examples of decimated CSI-RS patterns for 8 CSI-RS APs that occupy the same REs as conventional CSI-RS patterns for 4 CSI-RS APs, as shown in FIG. 4. Additionally, the right pattern in FIG. 8 is an example of a decimated CSI-RS pattern for 8 CSI-RS APs that occupy the same REs as a conventional CSI-RS pattern for 2 CSI-RS APs, as shown in FIG. 3. In various aspects, decimated CSI-RS patterns that occupy the same REs as conventional 2 CSI-RS AP patterns can comprise a 4 CSI-RS AP pattern with a frequency decimation factor of N=2 PRBs or an 8 CSI-RS AP pattern with a frequency decimation factor of N=4 PRBs occupying REs corresponding to any of the patterns shown in FIG. 3. Additionally, decimated CSI-RS patterns that occupy the same REs as conventional 4 CSI-RS AP patterns can comprise an 8 CSI-RS AP pattern with a frequency decimation factor of N=2 PRBs occupying REs corresponding to any of the patterns shown in FIG. 4. From this perspective, the reduction of overhead caused by CSI-RS transmission can be also provided to the legacy UEs scheduled in the subframe with CSI-RS.

In some embodiments, the set of PRBs transmitting CSI-RS can be indicated to a UE via resource allocation signaling. As one example, the set of PRBs used for CSI-RS transmission can be indicated by using resource allocation type 0, where the signaling comprises a bitmap. Each bit in the bitmap can correspond to the CSI-RS resource block group comprising a set of M adjacent PRBs. In other examples, the set of PRBs transmitting CSI-RS can be indicated via other resource allocation types.

In various aspects, techniques for CSI-RS overhead reduction discussed herein can be used together with measurement restriction(s) in time and/or frequency to allow beam cycling in the corresponding dimensions.

Figure 9:
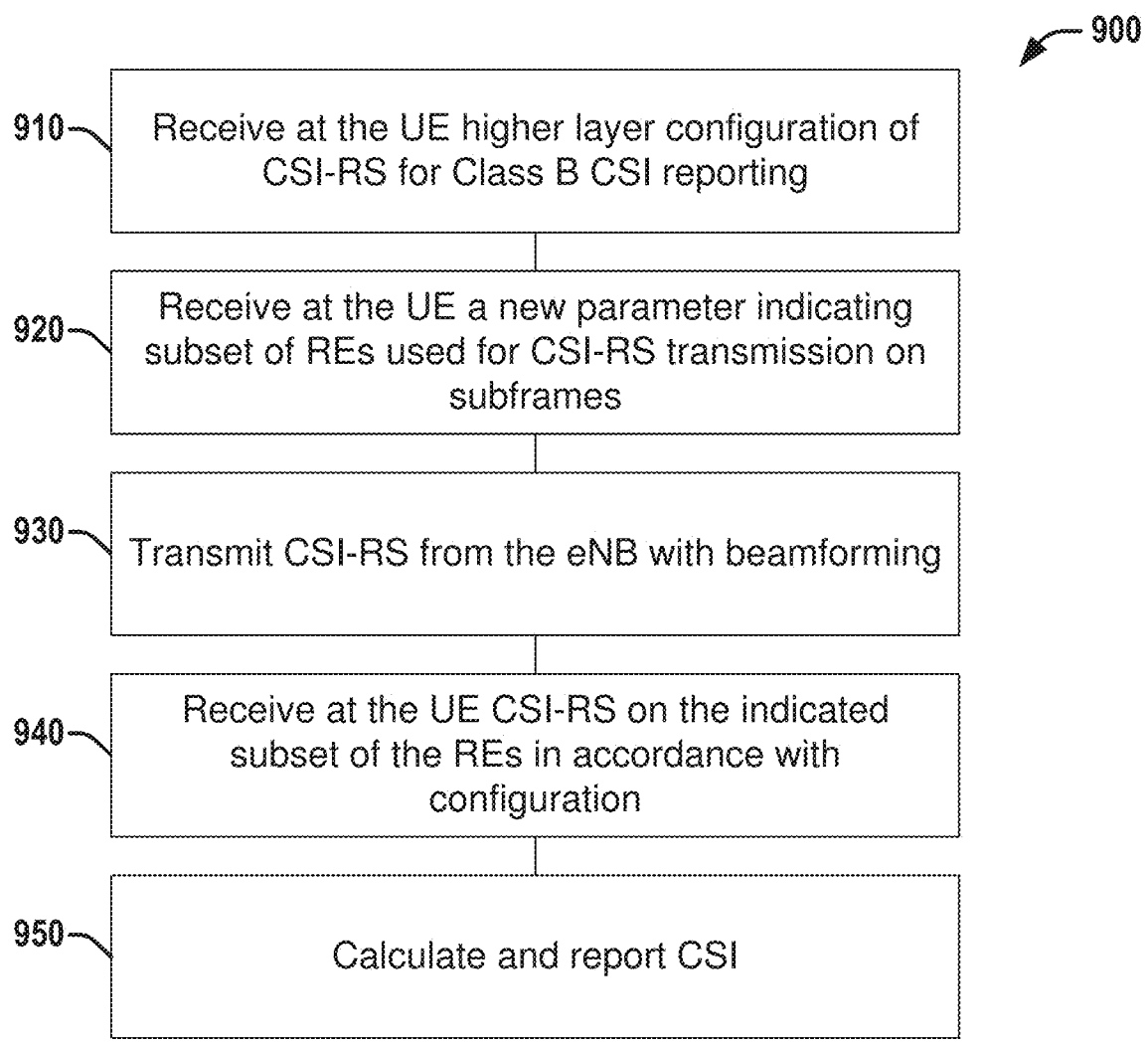
FIG. 9 is a flow diagram illustrating an example method of facilitating overhead reduction due to CSI-RS for class B CSI reporting, according to various aspects described herein.

Referring to FIG. 9, illustrated is a flow diagram of an example method 900 of facilitating overhead reduction due to CSI-RS for class B CSI reporting, according to various aspects described herein.

At 910, a UE can receive higher layer configuration of CSI-RS for Class B CSI reporting.

At 920, the UE can receive additional configuration comprising one or more parameters that indicate a subset of REs used for CSI-RS transmission on subframes.

At 930, an eNB can transmit CSI-RS with beamforming via the indicated subset of REs.

At 940, the UE can receive CSI-RS on the indicated subset of the REs based on the configuration.

At 950, the UE can calculate and report CSI based at least in part on the received CSI-RS.

Figure 10:
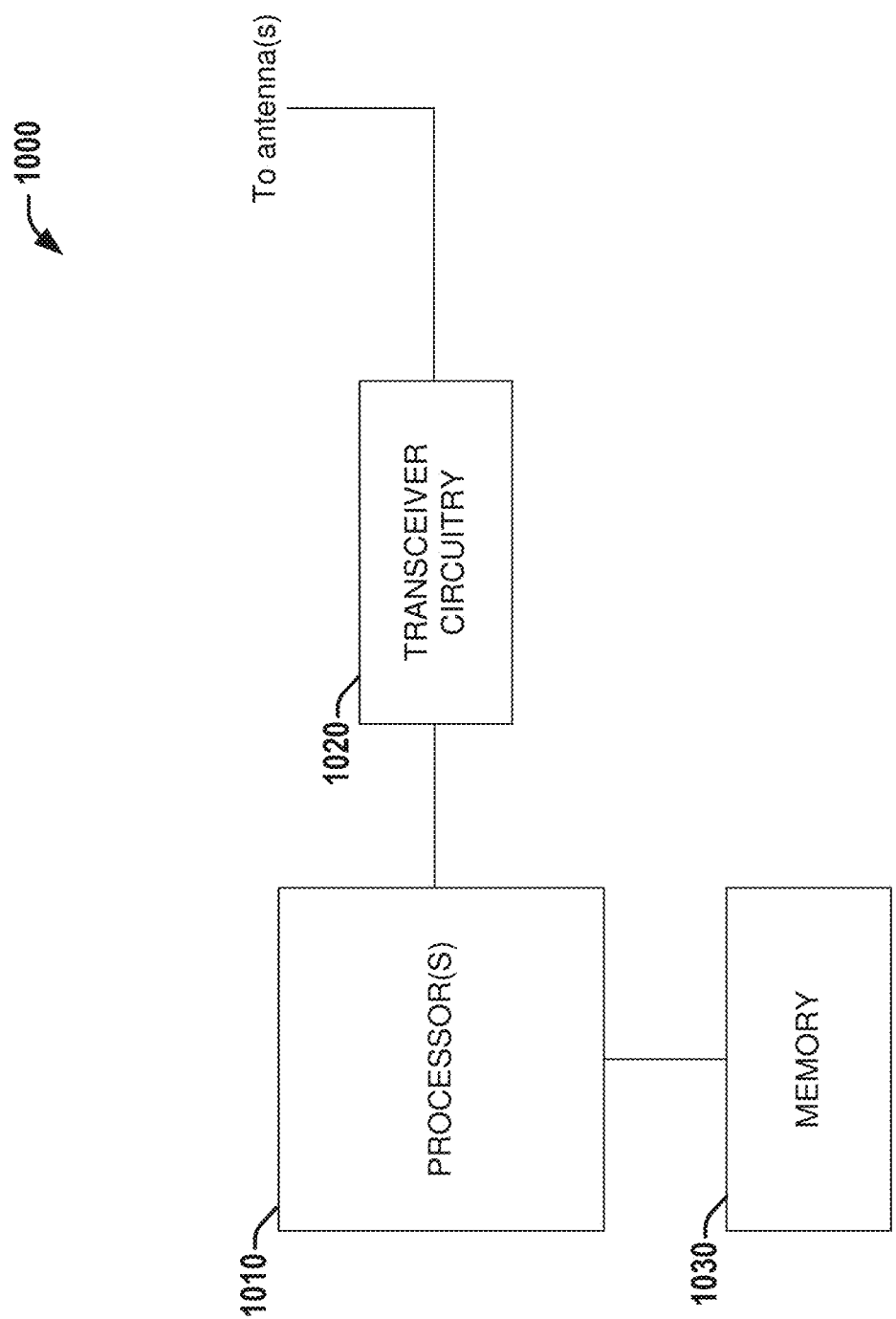
FIG. 10 is a block diagram illustrating a system that facilitates measurement of CSI based on beamformed CSI-RS having reduced overhead, according to various aspects described herein.

Referring to FIG. 10, illustrated is a block diagram of a system 1000 that facilitates measurement of CSI based on beamformed CSI-RS having reduced overhead, according to various aspects described herein. System 1000 can include one or more processors 1010 (e.g., one or more baseband processors such as one or more of the baseband processors discussed in connection with FIG. 1), transceiver circuitry 1020 (e.g., comprising one or more of transmitter circuitry or receiver circuitry, which can employ common circuit elements, distinct circuit elements, or a combination thereof), and a memory 1030 (which can comprise any of a variety of storage mediums and can store instructions and/or data associated with one or more of processor(s) 1010 or transceiver circuitry 1020). In various aspects, system 1000 can be included within a user equipment (UE). As described in greater detail below, system 1000 can determine, based on higher layer signaling, a subset of REs associated with one or more CSI-RS resources, and measure parameter(s) based on the subset of REs.

Transceiver circuitry 1020 can receive, and processor(s) 1010 can process, a first set of higher layer signaling from a serving (BS) base station. Based on the first set of higher layer signaling, processor(s) 1010 can determine one or more CSI-RS resources associated with the UE employing system 1000, and a set of REs associated with the one or more CSI-RS resources (e.g., for each CSI-RS resource, there can be an associated CSI-RS pattern indicating a RE for each of one or more CSI-RS APs (e.g., 1, 2, 4, or 8 APs, etc.) in each PRB of a set of continuous PRBs in which CSI-RS can be scheduled). Depending on the type of received signal or message, processing (e.g., by processor(s) 1010, processor(s) 1110, etc.) can comprise one or more of: identifying physical resources associated with the signal/message, detecting the signal/message, resource element group deinterleaving, demodulation, descrambling, and/or decoding.

Additionally, transceiver circuitry 1020 can receive, and processor(s) 1010 can process, a second set of higher layer signaling (e.g., CSI-RS configuration signaling) from the serving BS. In various aspects, the second set of higher layer signaling can comprise one or more CSI-RS configuration parameters. Based on the second set of higher layer signaling (e.g., on the one or more CSI-RS configuration parameters), processor(s) 1010 can identify a subset of the set of REs (e.g., a subset of the REs) associated with the CSI-RS resource(s) for a beamformed CSI-RS transmission.

Transceiver circuitry 1020 can receive CSI-RS via the subset of the REs, which processor(s) 1010 can process by decoding and measuring one or more CSI parameters (e.g., CQI (channel quality information), PMI (precoding matrix indicator), RI (rank indicator), etc.). Based on the measured CSI parameters, processor(s) 1010 can generate a CSI report that indicates one or more of the measured CSI parameters, which can be output to transceiver circuitry 1020 for transmission to the serving BS. Depending on the type of signal or message generated, outputting for transmission (e.g., by processor(s) 1010, processor(s) 1110, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.).

In various aspects, the subset of REs can vary based on the second higher layer signaling (e.g., based on the CSI-RS configuration parameter(s)), based on time (e.g., CSI-RS transmission instance(s), subframe index(es), etc.), etc.

As an example, the CSI-RS configuration parameters can comprise a frequency decimation factor (e.g., the frequency decimation factor N as discussed herein), wherein the frequency decimation factor can indicate a reduction in the frequency density of CSI-RS by a factor of N (for N some integer greater than 1) compared to conventional CSI-RS.

For example, with a frequency decimation factor N, for a given CSI-RS resource, instead of one RE for each CSI-RS AP in each PRB, there can be one RE for each CSI-RS AP in each set of N continuous PRBs. In some aspects, each set of N continuous PRBs can comprise a single PRB comprising the RE(s) for each CSI-RS AP in that set of N continuous PRBs, while in other aspects, those RE(s) can be within more than one PRB from that set of N continuous PRBs.

In the same or other aspects, the CSI-RS configuration parameters can indicate one or more frequency shifts (e.g., in PRB(s), subcarrier(s), etc.) associated with the subset of REs, from which processor(s) 1010 can determine the PRB(s) and/or subcarrier(s) for RE(s) of the subset. For example, in some aspects, a single common frequency shift can be indicated, which can apply to all REs for all CSI-RS APs. In such aspects, with a frequency decimation factor of N, the processor(s) 1010 can determine based on the common frequency shift which single PRB from each set of N continuous PRBs comprises the RE(s) for each CSI-RS AP in that set of N continuous PRBs. As another example, the CSI-RS configuration parameters can comprise more than one frequency shift, e.g., a distinct frequency shift associated with each of two or more sets of CSI-RS APs, which can indicate specific PRB(s) and/or subcarrier(s) for the RE(s) of the associated sets of CSI-RS APs within that set of N continuous PRBs. Additionally or alternatively, distinct frequency offsets can be applied for different CSI-RS resources or sets of CSI-RS resources. As one example, a first frequency shift (e.g., in PRB(s), subcarrier(s), etc.) can apply to the RE(s) for a first CSI-RS resource, a second frequency shift (e.g., in PRB(s), subcarrier(s), etc.) can apply to the RE(s) for a second CSI-RS resource, etc.

In the same or other aspects, the processor(s) 1010 can determine the RE(s) of the subset based at least in part on a resource allocation indicated via the CSI-RS configuration parameters. As one example, the resource allocation can comprise a bitmap that indicates PRB(s) that comprise RE(s) of the subset, etc.

Additionally or alternatively, in various aspects, the subset of RE(s) can be time varying. In some such aspects, for a frequency decimation factor N, the subset of RE(s) can cycle through N possible values, such as based on a modulo base N of the CSI-RS transmission instance (e.g., based on mod(i,N), where i is the CSI-RS transmission instance). In other such aspects, the subset of RE(s) can vary in time based on a pseudo-random sequence, for example, one initialized based on a seed that can be configured via the second higher layer signaling (e.g., RRC (Radio Resource Control), etc.).

In some aspects, the second higher layer signaling can indicate a measurement restriction in time and/or a measurement restriction in frequency, wherein processor(s) 1010 can measure the CSI parameter(s) in accordance with the measurement restriction(s).

Figure 11:
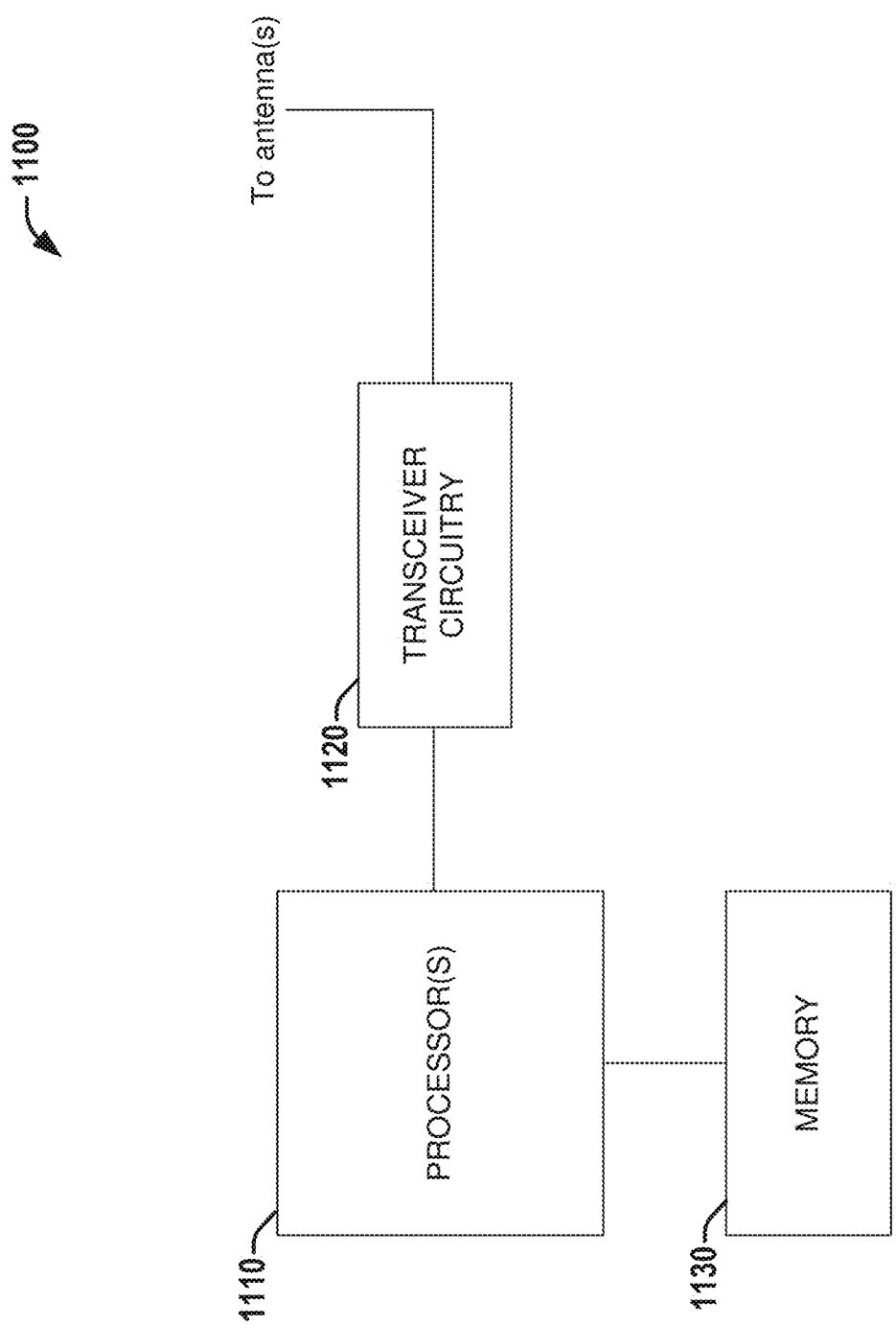
FIG. 11 is a block diagram illustrating a system that facilitates overhead reduction associated with CSI-RS transmission for beamformed CSI-RS, according to various aspects described herein.

Referring to FIG. 11, illustrated is a block diagram of a system 1100 at a base station that facilitates overhead reduction associated with CSI-RS transmission for beamformed CSI-RS, according to various aspects described herein. System 1100 can include one or more processors 1110 (e.g., one or more baseband processors such as one or more of the baseband processors discussed in connection with FIG. 1), transceiver circuitry 1120 (e.g., which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 1130 (which can comprise any of a variety of storage mediums and can store instructions and/or data associated with one or more of processor(s) 1110 or transceiver circuitry 1120). In various aspects, system 1100 can be included within an Evolved Universal Terrestrial Radio Access Network (E-UTRAN) Node B (Evolved Node B, eNodeB, or eNB) or other base station in a wireless communications network. In some aspects, the processor(s) 1110, transceiver circuitry 1120, and the memory 1130 can be included in a single device, while in other aspects, they can be included in different devices, such as part of a distributed architecture. As described in greater detail below, system 1100 can facilitate configuration of a reduced number of RE(s) for signaling CSI-RS in connection with Class B (e.g., beamformed) CSI-RS.

Processor(s) 1110 can generate a first set of higher layer signaling that can configure one or more CSI-RS resources for a UE, and can output the first set of higher layer signaling to transceiver circuitry 1120 for transmission to that UE. The one or more CSI-RS resources can be associated with a set of RE(s), via each configured CSI-RS resource being associated with a distinct RE for each of one or more CSI-RS APs (e.g., 1, 2, 4, 8, etc.) in each PRB of a continuous set of PRBs.

Additionally, processor(s) 1110 can generate, and output to transceiver circuitry 1120 for transmission, a second set of higher layer signaling that can comprise one or more CSI-RS configuration parameters that can indicate a subset of the set of REs (e.g., a subset of REs) for a beamformed CSI-RS transmission. The CSI-RS configuration parameters in the second higher layer signaling can comprise a frequency decimation factor (N), that can indicate the ratio of REs in the set of REs to those in the subset of REs. The CSI-RS configuration parameters can also comprise one or more frequency shifts ($N_{shift}$), such as a common frequency shift for all REs of the subset, two or more distinct frequency shifts for REs of distinct sets of CSI-RS APs, etc. In the same or other aspects, the CSI-RS configuration parameters can include a resource allocation (e.g., of any of a variety of resource allocation types) that can indicate PRB(s) and/or subcarrier(s) for RE(s) of the subset.

Additionally, processor(s) 1110 can indicate, via the second higher layer signaling, whether or not the subset of REs varies in time. For example, the subset of REs can cycle through N possible values over N different transmission instances of CSI-RS, such as based on a modulo base N of the transmission instance. In other aspects, the subset of REs can vary based on a pseudo-random sequence, which can be initialized by an initialization seed indicated via the second higher layer signaling.

In the same or other aspects, via the second higher layer signaling, processor(s) 1110 can indicate one or more measurement restrictions for measurement of the CSI-RS (e.g., in time and/or frequency) by the UE.

Processor(s) 1110 can encode a set of CSI-RS for a beamformed CSI-RS transmission, and can map the set of CSI-RS to the subset of REs for transmission by transceiver circuitry 1120.

In response to the transmission of the CSI-RS by transceiver circuitry 1120, transceiver circuitry 1120 can receive a CSI report from the UE comprising one or more CSI parameters associated with the set of CSI-RS.

Figure 12:
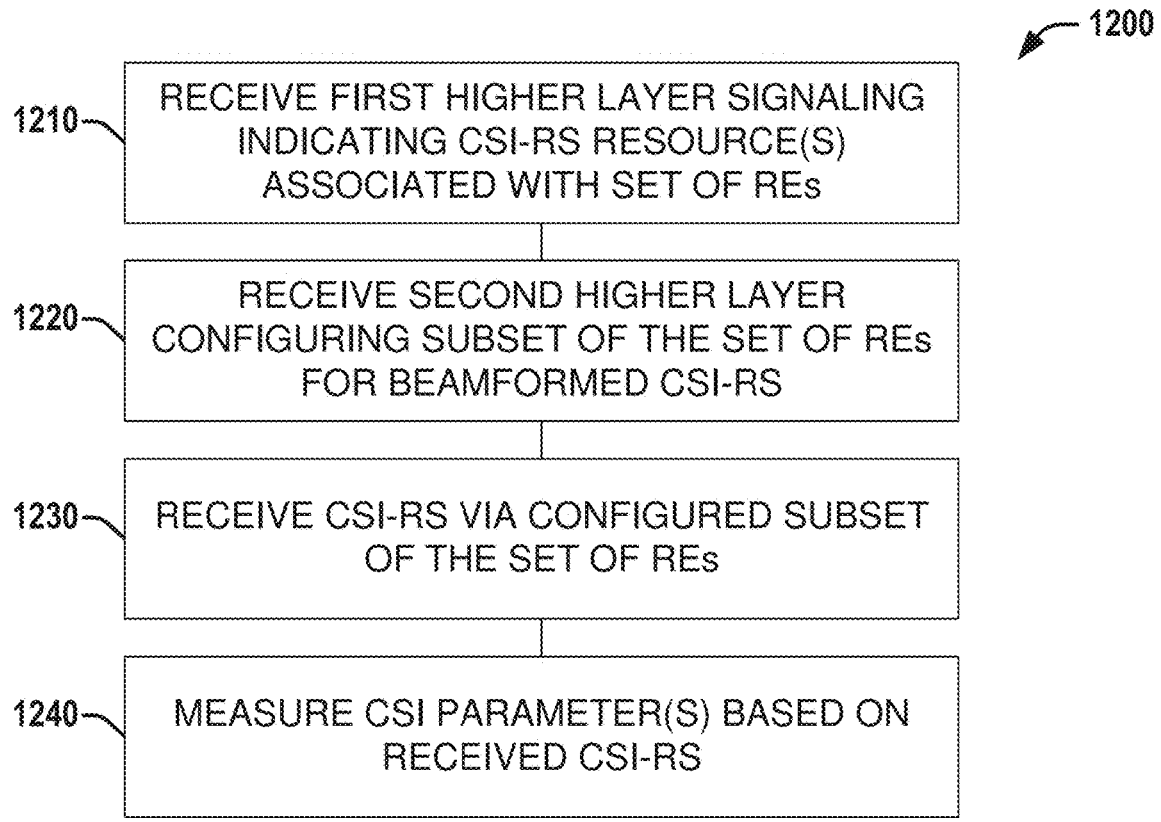
FIG. 12 is a flow diagram illustrating a method that facilitates measurement of CSI based on beamformed CSI-RS transmitted with reduced overhead, according to various aspects described herein.

Referring to FIG. 12, illustrated is a flow diagram of a method 1200 that facilitates measurement of CSI based on beamformed CSI-RS transmitted with reduced overhead, according to various aspects described herein. In some aspects, method 1200 can be performed at a UE. In other aspects, a machine readable medium can store instructions associated with method 1200 that, when executed, can cause a UE to perform the acts of method 1200.

At 1210, a first set of higher layer signaling can be received configuring one or more CSI-RS resources for the UE, wherein the one or more CSI-RS resources are associated with a set of REs.

At 1220, a second set of higher layer signaling can be received configuring (e.g., via one or more CSI-RS configuration parameters, etc.) a subset of the set of REs for a beamformed CSI-RS transmission.

At 1230, the beamformed CSI-RS transmission can be received via the configured subset of the set of REs.

At 1240, one or more CSI parameters can be measured based on the received beamformed CSI-RS transmission.

Additionally or alternatively, method 1200 can include one or more other acts described above in connection with system 1000.

Figure 13:
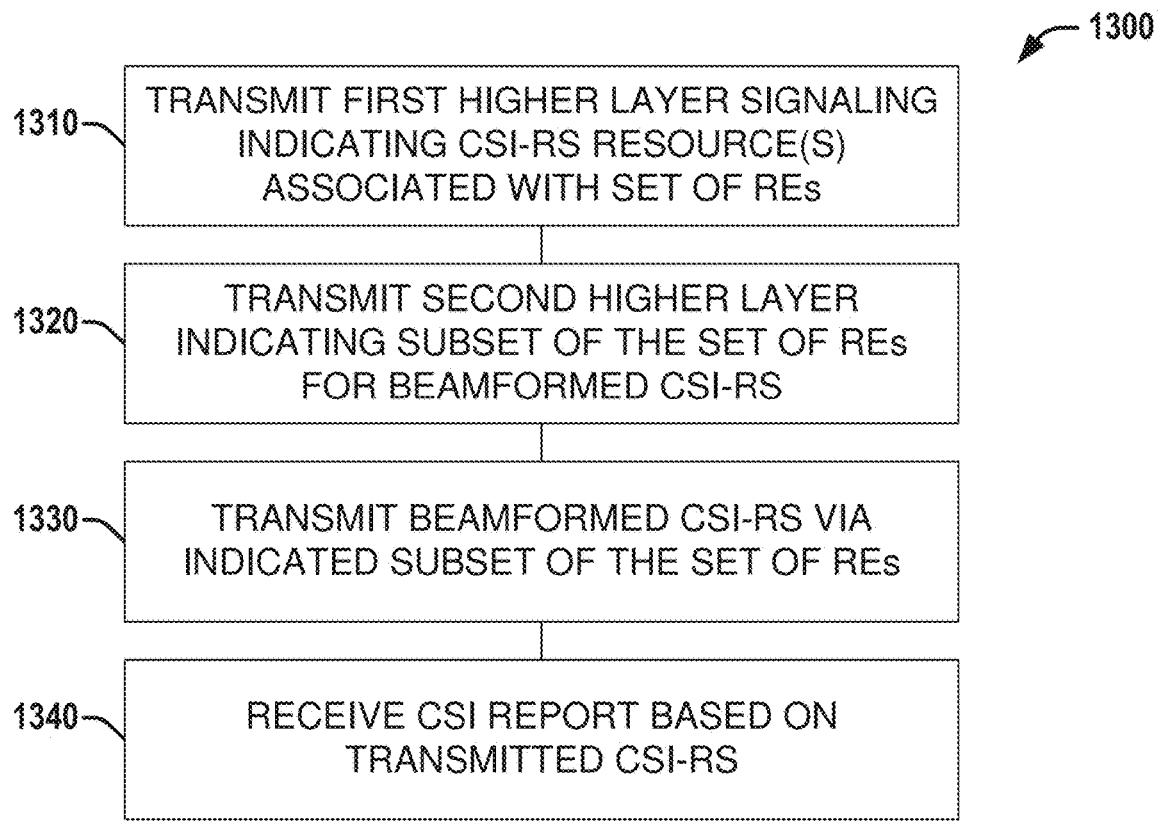
FIG. 13 is a flow diagram illustrating a method that facilitates overhead reduction in beamformed transmission of CSI-RS, according to various aspects described herein.

Referring to FIG. 13, illustrated is a flow diagram of a method 1300 that facilitates overhead reduction in beamformed transmission of CSI-RS, according to various aspects described herein. In some aspects, method 1300 can be performed at an eNB. In other aspects, a machine readable medium can store instructions associated with method 1300 that, when executed, can cause an eNB to perform the acts of method 1300.

At 1310, a first set of higher layer signaling can be transmitted that indicates one or more CSI-RS resources for a UE, wherein the one or more CSI-RS resources are associated with a set of REs.

At 1320, a second set of higher layer signaling can be transmitted that indicates a subset of the set of REs.

At 1330, beamformed CSI-RS can be transmitted via the indicated subset of the set of REs.

At 1340, a CSI report can be received from the UE indicating one or more CSI parameters based on the CSI-RS.

Additionally or alternatively, method 1300 can include one or more other acts described above in connection with system 1100.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a User Equipment (UE), comprising: a memory; and one or more processors configured to: process higher layer signaling indicating one or more CSI (Channel State Information)-RS (Reference Signal) resources associated with a plurality of REs (Resource Elements) comprising a RE for each CSI-RS resource for each of one or more CSI-RS APs (Antenna Ports) in each of a plurality of continuous PRBs (physical resource blocks); process additional higher layer signaling comprising one or more CSI-RS parameters that indicate a subset of the plurality of REs associated with a beamformed CSI-RS transmission; decode one or more CSI-RSs from the indicated subset; and measure one or more CSI parameters based on the decoded one or more CSI-RSs.

Example 2 comprises the subject matter of any variation of any of example(s) 1, wherein the one or more CSI-RS parameters comprises a frequency decimation factor equal to N, wherein N is an integer greater than 1, wherein the subset comprises the RE for each CSI-RS resource for each of the one or more CSI-RS APs in each set of N continuous PRBs of the plurality of continuous PRBs.

Example 3 comprises the subject matter of any variation of any of example(s) 2, wherein the one or more CSI-RS parameters comprises one or more frequency shifts, wherein each frequency shift of the one or more frequency shifts is associated with at least one of the one or more CSI-RS APs.

Example 4 comprises the subject matter of any variation of any of example(s) 3, wherein the one or more frequency shifts comprises a common frequency shift associated with each of the one or more CSI-RS APs, wherein each set of N continuous PRBs comprises a single PRB that comprises the RE for each CSI-RS resource for each of the one or more CSI-RS APs in that set of N continuous PRBs, and wherein the one or more processors are further configured to determine the single PRB of each set of N continuous PRBs based on the common frequency shift.

Example 5 comprises the subject matter of any variation of any of example(s) 3, wherein the one or more frequency shifts comprises a first frequency shift associated with a first set of CSI-RS APs of the one or more CSI-RS APs, and a distinct second frequency shift associated with a distinct second set of CSI-RS APs of the one or more CSI-RS APs.

Example 6 comprises the subject matter of any variation of any of example(s) 1, wherein the one or more CSI-RS parameters indicate the subset of the plurality of REs via a resource allocation indicating a subset of the plurality of continuous PRBs.

Example 7 comprises the subject matter of any variation of any of example(s) 1-6, wherein the additional higher layer signaling indicates at least one of a time measurement restriction or a frequency measurement restriction, and wherein the one or more processors are configured to measure the one or more CSI parameters based on the at least one of the time measurement restriction or the frequency measurement restriction.

Example 8 comprises the subject matter of any variation of any of example(s) 1-6, wherein the subset of the plurality of REs is time-dependent.

Example 9 comprises the subject matter of any variation of any of example(s) 8, wherein the subset of the plurality of REs is based on a modulo base N of a CSI-RS transmission instance, wherein N is a frequency decimation factor indicated via the additional higher layer signaling.

Example 10 comprises the subject matter of any variation of any of example(s) 8, wherein the subset of the plurality of REs is based on a pseudo-random sequence.

Example 11 comprises the subject matter of any variation of any of example(s) 10, wherein the pseudo-random sequence is based on an initialization seed indicated via RRC (Radio Resource Control) signaling.

Example 12 comprises the subject matter of any variation of any of example(s) 1-6, wherein the one or more CSI-RS APs comprises one, two, four, or eight CSI-RS APs.

Example 13 comprises the subject matter of any variation of any of example(s) 1-5, wherein the one or more CSI-RS parameters indicate the subset of the plurality of REs via a resource allocation indicating a subset of the plurality of continuous PRBs.

Example 14 comprises the subject matter of any variation of any of example(s) 1-7, wherein the subset of the plurality of REs is time-dependent.

Example 15 is an apparatus configured to be employed in an Evolved NodeB (eNB), comprising: a memory; and one or more processors configured to: generate a first set of higher layer signaling that configures at least one CSI (Channel State Information)-RS (Reference Signal) resource for a UE, wherein the at least one CSI-RS resource is associated with a plurality of REs (Resource Elements) over a plurality of continuous PRBs (physical resource blocks), and wherein each CSI-RS resource is associated with a CSI-RS pattern comprising a distinct RE for each of one or more CSI-RS APs (Antenna Ports) in each PRB of the plurality of continuous PRBs; generate a second set of higher layer signaling that indicates a subset of the plurality of REs for a beamformed CSI-RS transmission; encode a set of beamformed CSI-RS; and map the set of beamformed CSI-RS to the subset of the plurality of REs.

Example 16 comprises the subject matter of any variation of any of example(s) 15, wherein the second set of higher layer signaling comprises a frequency decimation factor, N, wherein N is an integer greater than 1, wherein the subset comprises, for each CSI-RS resource, one RE for each of the one or more CSI-RS APs in each set of N continuous PRBs of the plurality of continuous PRBs.

Example 17 comprises the subject matter of any variation of any of example(s) 16, wherein the second set of higher layer signaling indicates a frequency shift that indicates a single PRB of each set of N continuous PRBs comprises the one RE for each of the one or more CSI-RS APs in each set of N continuous PRBs, and wherein the one or more processors are configured to map the set of beamformed CSI-RS to the single PRB of each set of N continuous PRBs based on the CSI-RS pattern associated with each CSI-RS resource.

Example 18 comprises the subject matter of any variation of any of example(s) 16, wherein the second set of higher layer signaling indicates at least a first frequency shift and a distinct second frequency shift, wherein the first frequency shift is associated with a first subset of the one or more CSI-RS APs, and wherein the second frequency shift is associated with a distinct second subset of the one or more CSI-RS APs.

Example 19 comprises the subject matter of any variation of any of example(s) 18, wherein each set of N continuous PRBs comprises a first PRB comprising the one RE for each CSI-RS APs of the first subset of the one or more CSI-RS APs, and comprises a distinct second PRB comprising the one RE for each CSI-RS APs of the distinct second subset of the one or more CSI-RS APs.

Example 20 comprises the subject matter of any variation of any of example(s) 15-19, wherein the subset is based at least in part on a CSI-RS transmission instance associated with the set of beamformed CSI-RS.

Example 21 comprises the subject matter of any variation of any of example(s) 15-19, wherein the second set of higher layer signaling indicates the subset of the plurality of REs via a resource allocation indicating one or more PRBs of the plurality of continuous PRBs.

Example 22 comprises the subject matter of any variation of any of example(s) 21, wherein the resource allocation indicates the one or more PRBs of the plurality of continuous PRBs via a bitmap.

Example 23 is a machine readable medium comprising instructions that, when executed, cause a User Equipment (UE) to: receive first higher layer signaling that indicates one or more CSI (Channel State Information)-RS (Reference Signal) resources associated with a plurality of REs (Resource Elements), wherein the plurality of REs comprises a RE for each CSI-RS resource for each of one or more CSI-RS APs (Antenna Ports) in each of a plurality of continuous PRBs (physical resource blocks); receive second higher layer signaling comprising one or more CSI-RS parameters that indicate a subset of the plurality of REs; receive beamformed CSI-RS via the subset of the plurality of REs; measure one or more CSI parameters based on the received beamformed CSI-RS; and output a CSI report that indicates the measured one or more CSI parameters.

Example 24 comprises the subject matter of any variation of any of example(s) 23, wherein the one or more parameters comprise a frequency decimation factor, N, wherein N is an integer greater than 1, wherein the subset of the plurality of REs comprises one RE for each CSI-RS resource for each of one or more CSI-RS APs (Antenna Ports) in each N continuous PRBs of the plurality of continuous PRBs (physical resource blocks).

Example 25 comprises the subject matter of any variation of any of example(s) 23-24, wherein the one or more parameters comprise a frequency shift that indicates one or more PRBs of the plurality of continuous PRBs, wherein the indicated one or more PRBs comprise the subset of the plurality of REs.

Example 26 comprises the subject matter of any variation of any of example(s) 23-24, wherein the one or more parameters comprise a first frequency shift and a second frequency shift, wherein the first frequency shift indicates a first set of PRBs of the plurality of continuous PRBs and the second frequency shift indicates a second set of PRBs of the plurality of continuous PRBs, wherein the first set of PRBs comprise REs of the subset of the plurality of REs for a first subset of the one or more CSI-RS APs, and wherein the second set of PRBs comprise REs of the subset of the plurality of REs for a second subset of the one or more CSI-RS APs.

Example 27 is an apparatus configured to be employed in a User Equipment (UE), comprising: means for receiving first higher layer signaling that indicates one or more CSI (Channel State Information)-RS (Reference Signal) resources associated with a plurality of REs (Resource Elements), wherein the plurality of REs comprises a RE for each CSI-RS resource for each of one or more CSI-RS APs (Antenna Ports) in each of a plurality of continuous PRBs (physical resource blocks); means for receiving second higher layer signaling comprising one or more CSI-RS parameters that indicate a subset of the plurality of REs; means for receiving beamformed CSI-RS via the subset of the plurality of REs; means for measuring one or more CSI parameters based on the received beamformed CSI-RS; and means for outputting a CSI report that indicates the measured one or more CSI parameters.

Example 28 comprises the subject matter of any variation of any of example(s) 27, wherein the one or more parameters comprise a frequency decimation factor, N, wherein N is an integer greater than 1, wherein the subset of the plurality of REs comprises one RE for each CSI-RS resource for each of one or more CSI-RS APs (Antenna Ports) in each N continuous PRBs of the plurality of continuous PRBs (physical resource blocks).

Example 29 comprises the subject matter of any variation of any of example(s) 27-28, wherein the one or more parameters comprise a frequency shift that indicates one or more PRBs of the plurality of continuous PRBs, wherein the indicated one or more PRBs comprise the subset of the plurality of REs.

Example 30 comprises the subject matter of any variation of any of example(s) 27-28, wherein the one or more parameters comprise a first frequency shift and a second frequency shift, wherein the first frequency shift indicates a first set of PRBs of the plurality of continuous PRBs and the second frequency shift indicates a second set of PRBs of the plurality of continuous PRBs, wherein the first set of PRBs comprise REs of the subset of the plurality of REs for a first subset of the one or more CSI-RS APs, and wherein the second set of PRBs comprise REs of the subset of the plurality of REs for a second subset of the one or more CSI-RS APs.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus for a User Equipment (UE), the apparatus comprising:
    a memory; and
    one or more processors configured to:
        process higher layer signaling comprising one or more Channel State Information-Reference Signal (CSI-RS) parameters indicating, for a CSI-RS Antenna Port (AP), a density of CSI-RS resources of less than 1 Resource Element (RE) per Physical Resource Block (PRB), wherein the density of CSI-RS resources is one RE for each CSI-RS AP of one or more CSI-RS APs, comprising the CSI-RS AP, in each set of N continuous PRBs, where N is an integer greater than 1;
        decode one or more CSI-RSs based on the one or more CSI-RS parameters; and
        measure one or more Channel State Information (CSI) parameters based on the decoded one or more CSI-RSs.

2. The apparatus of claim 1, wherein the CSI-RS parameters apply to a set of N PRBs continuous in a frequency domain.

3. The apparatus of claim 1, wherein the one or more CSI-RS parameters comprises one or more frequency shifts, and wherein each frequency shift of the one or more frequency shifts is associated with at least one of the one or more CSI-RS APs.

4. The apparatus of claim 3, wherein the one or more frequency shifts comprises a common frequency shift associated with each of the one or more CSI-RS APs, wherein each set of N continuous PRBs comprises a single PRB that comprises the RE for each CSI-RS resource for each of the one or more CSI-RS APs in that set of N continuous PRBs, and wherein the one or more processors are further configured to determine the single PRB of each set of N continuous PRBs based on the common frequency shift.

5. The apparatus of claim 4, wherein the one or more frequency shifts comprises a first frequency shift associated with a first set of CSI-RS APs of the one or more CSI-RS APs, and a distinct second frequency shift associated with a distinct second set of CSI-RS APs of the one or more CSI-RS APs.

6. The apparatus of claim 1, wherein the higher layer signaling indicates at least one of a time measurement restriction or a frequency measurement restriction, and wherein the one or more processors are configured to measure the one or more CSI parameters based on the at least one of the time measurement restriction or the frequency measurement restriction.

7. The apparatus of claim 1, wherein the CSI-RSs vary based on a pseudo-random sequence.

8. The apparatus of claim 7, wherein the pseudo-random sequence is based on an initialization seed indicated via RRC (Radio Resource Control) signaling.

9. The apparatus of claim 1, wherein one or more CSI-RS APs comprising the CSI-RS AP comprises one, two, four, or eight CSI-RS APs.

10. An apparatus for a User Equipment (UE), the apparatus comprising:
    a memory; and
    one or more processors configured to:
        process higher layer signaling comprising one or more Channel State Information-Reference Signal (CSI-RS) parameters indicating a density of CSI-RS resources is one Resource Element (RE) for each CSI-RS Antenna Port (AP) in each set of N continuous PRBs, where N is an integer greater than 1, wherein the one or more CSI-RS parameters comprises one or more frequency shifts, and wherein each frequency shift of the one or more frequency shifts is associated with at least one of one or more CSI-RS APs;
        decode one or more CSI-RSs based on the one or more CSI-RS parameters; and
        measure the one or more Channel State Information (CSI) parameters based on the decoded one or more CSI-RSs.

11. The apparatus of claim 10, wherein the CSI-RS parameters apply to a set of N PRBs continuous in a frequency domain.

12. The apparatus of claim 10, wherein the higher layer signaling indicates at least one of a time measurement restriction or a frequency measurement restriction, and wherein the one or more processors are configured to measure the one or more CSI parameters based on the at least one of the time measurement restriction or the frequency measurement restriction.

13. An apparatus configured to be employed in a base station, comprising:

a memory; and
one or more processors configured to:
generate higher layer signaling comprising one or more Channel State Information-Reference Signal (CSI-RS) parameters indicating, for a CSI-RS Antenna Port (AP), a density of CSI-RS resources of less than 1 Resource Element (RE) per Physical Resource Block (PRB), wherein the density of CSI-RS resources is one RE for each CSI-RS AP in each set of N continuous PRBs, where N is an integer greater than 1;
encode one or more CSI-RSs based on the one or more CSI-RS parameters; and
map the one or more CSI-RSs based on the one or more CSI-RS parameters.

14. The apparatus of claim 13, wherein the CSI-RS parameters apply to a set of N PRBs continuous in a frequency domain, where N is greater than 1.

15. The apparatus of claim 13, wherein the higher layer signaling indicates a frequency shift that indicates a single PRB of each set of N continuous PRBs comprises the one RE for each of one or more CSI-RS APs comprising the CSI-RS AP in each set of N continuous PRBs, and wherein the one or more processors are configured to map the one or more CSI-RSs to the single PRB of each set of N continuous PRBs based on a CSI-RS pattern associated with each CSI-RS resource.

16. The apparatus of claim 13, wherein the higher layer signaling indicates at least a first frequency shift and a distinct second frequency shift, wherein the first frequency shift is associated with a first subset of one or more CSI-RS APs comprising the CSI-RS AP, and wherein the distinct second frequency shift is associated with a distinct second subset of the one or more CSI-RS APs.

17. The apparatus of claim 16, wherein each set of N continuous PRBs comprises a first PRB comprising the one RE for each CSI-RS APs of the first subset of the one or more CSI-RS APs, and comprises a distinct second PRB comprising the one RE for each CSI-RS APs of the distinct second subset of the one or more CSI-RS APs.

* * * * *